United States Patent
Liu et al.

(10) Patent No.: US 12,503,554 B2
(45) Date of Patent: Dec. 23, 2025

(54) (METH)ACRYLATE FUNCTIONAL SILICONE AND METHODS FOR ITS PREPARATION AND USE

(71) Applicant: Dow Silicones Corporation, Midland, MI (US)

(72) Inventors: Nanguo Liu, Midland, MI (US); Zachary Wenzlick, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 672 days.

(21) Appl. No.: 17/905,028

(22) PCT Filed: Apr. 13, 2021

(86) PCT No.: PCT/US2021/026944
§ 371 (c)(1),
(2) Date: Aug. 25, 2022

(87) PCT Pub. No.: WO2021/225757
PCT Pub. Date: Nov. 11, 2021

(65) Prior Publication Data
US 2023/0174721 A1    Jun. 8, 2023

Related U.S. Application Data

(60) Provisional application No. 63/021,182, filed on May 7, 2020.

(51) Int. Cl.
C08G 77/20    (2006.01)
C08G 77/06    (2006.01)
C08G 77/08    (2006.01)
C08G 77/34    (2006.01)

(52) U.S. Cl.
CPC ............ *C08G 77/06* (2013.01); *C08G 77/20* (2013.01); *C08G 77/34* (2013.01)

(58) Field of Classification Search
CPC ......... C08G 77/06; C08G 77/08; C08G 77/20
USPC .......................................................... 528/32
See application file for complete search history.

(56) References Cited

U.S. PATENT DOCUMENTS

| | | | |
|---|---|---|---|
| 2,676,182 | A | 4/1954 | Daudt et al. |
| 3,159,601 | A | 12/1964 | Ashby et al. |
| 3,220,972 | A | 11/1965 | Lamoreaux et al. |
| 3,296,291 | A | 1/1967 | Scotia et al. |

(Continued)

FOREIGN PATENT DOCUMENTS

| | | |
|---|---|---|
| CA | 2336195 A1 | 12/1999 |
| EP | 0347895 B | 11/1993 |

(Continued)

OTHER PUBLICATIONS

"Macromolecular Materials and Engineering" by Hung-Wen et al, 2007, vol. 292, Issue 5, pp. 666-673.

(Continued)

*Primary Examiner* — Margaret G Moore
(74) *Attorney, Agent, or Firm* — Catherine U. Brown

(57) ABSTRACT

A (meth)acrylate functional silicone and method for its preparation are provided. This (meth)acrylate functional silicone may have pendant poly(meth)acrylate-functional groups. This (meth)acrylate functional silicone may have terminal alkenyl groups. This (meth)acrylate functional silicone may be used in pressure sensitive adhesives.

15 Claims, 1 Drawing Sheet

(56) References Cited

U.S. PATENT DOCUMENTS

| | | | |
|---|---|---|---|
| 3,419,593 | A | 12/1968 | Willing et al. |
| 3,516,946 | A | 6/1970 | Scotia et al. |
| 3,814,730 | A | 6/1974 | Karstedt et al. |
| 3,878,263 | A | 4/1975 | Martin |
| 3,989,668 | A | 11/1976 | Lee et al. |
| 4,250,053 | A | 2/1981 | Smith |
| 4,286,047 | A | 8/1981 | Bennett et al. |
| 4,503,208 | A | 3/1985 | Lin et al. |
| 4,584,355 | A | 4/1986 | Blizzard et al. |
| 4,585,669 | A | 4/1986 | Eckberg |
| 4,585,836 | A | 4/1986 | Homan et al. |
| 4,587,137 | A | 5/1986 | Eckberg |
| 4,591,622 | A | 5/1986 | Blizzard et al. |
| 4,611,042 | A | 9/1986 | Rivers-Farrell et al. |
| 4,766,176 | A | 8/1988 | Lee et al. |
| 4,774,310 | A | 9/1988 | Butler |
| 4,784,879 | A | 11/1988 | Lee et al. |
| 4,968,559 | A | 11/1990 | Kuroda et al. |
| 5,010,159 | A | 4/1991 | Bank et al. |
| 5,017,654 | A | 5/1991 | Togashi et al. |
| 5,036,117 | A | 7/1991 | Chung et al. |
| 5,118,567 | A | 6/1992 | Komiyama et al. |
| 5,175,325 | A | 12/1992 | Brown et al. |
| 5,217,805 | A | 6/1993 | Kessel et al. |
| 5,281,473 | A | 1/1994 | Ishiwata et al. |
| 5,457,220 | A | 10/1995 | Razzano |
| 5,516,812 | A * | 5/1996 | Chu .................. C08G 77/18 522/20 |
| 5,516,823 | A * | 5/1996 | Gentle ............... C08K 5/5425 524/588 |
| 5,516,858 | A | 5/1996 | Morita et al. |
| 5,982,041 | A | 11/1999 | Mitani et al. |
| 6,000,603 | A | 12/1999 | Koskenmaki et al. |
| 6,140,444 | A * | 10/2000 | Levandoski ......... C08G 77/42 528/21 |
| 6,239,246 | B1 | 5/2001 | Takahashi et al. |
| 6,281,285 | B1 | 8/2001 | Becker et al. |
| 6,515,041 | B2 * | 2/2003 | Hayashi .............. C09D 183/04 264/1.32 |
| 6,677,740 | B1 | 1/2004 | Chen et al. |
| 6,906,425 | B2 | 6/2005 | Stewart et al. |
| 7,659,003 | B2 | 2/2010 | Aoki et al. |
| 8,076,411 | B2 | 12/2011 | Maton et al. |
| 8,377,634 | B2 | 2/2013 | Albaugh et al. |
| 8,436,122 | B2 | 5/2013 | Kho et al. |
| 8,580,862 | B2 | 11/2013 | Barnes et al. |
| 8,618,234 | B2 | 12/2013 | Mizuno et al. |
| 8,920,592 | B2 | 12/2014 | Suwa et al. |
| 9,023,433 | B2 | 5/2015 | Fu et al. |
| 9,051,428 | B2 | 6/2015 | Davio et al. |
| 9,475,968 | B2 | 10/2016 | Hammond et al. |
| 9,593,209 | B2 | 3/2017 | Dent et al. |
| 9,751,988 | B2 | 9/2017 | Jo et al. |
| 9,853,193 | B2 | 12/2017 | Amako et al. |
| 10,167,418 | B2 | 1/2019 | Yamazaki et al. |
| 10,208,164 | B2 | 2/2019 | Dogen et al. |
| 11,697,714 | B2 * | 7/2023 | Mecca ................. C09J 7/38 525/63 |
| 12,398,270 | B2 * | 8/2025 | Liu ..................... C08G 77/08 |
| 2002/0016380 | A1 * | 2/2002 | Hayashi ............. C08F 283/124 522/99 |
| 2002/0071958 | A1 | 6/2002 | Mertz et al. |
| 2004/0116547 | A1 | 6/2004 | Bennington |
| 2011/0111217 | A1 | 5/2011 | Kuroda et al. |
| 2011/0224593 | A1 | 9/2011 | Tunius |
| 2013/0005935 | A1 * | 1/2013 | Staiger ................ C08G 77/06 556/443 |
| 2013/0310497 | A1 * | 11/2013 | Wu ..................... C08K 5/42 524/159 |
| 2015/0147510 | A1 | 5/2015 | Saito |
| 2018/0305547 | A1 | 10/2018 | Dogen et al. |
| 2019/0148598 | A1 | 5/2019 | Bower et al. |
| 2023/0091861 | A1 * | 3/2023 | Yook ................... C08K 5/08 524/588 |

FOREIGN PATENT DOCUMENTS

| | | |
|---|---|---|
| JP | H0853156 A | 2/1996 |
| JP | 3043988 B2 | 5/2000 |
| JP | 2000252342 A | 9/2000 |
| JP | 200327017 A | 1/2003 |
| JP | 2007254661 A | 10/2007 |
| KR | 101301941 B1 | 8/2013 |
| WO | 1997006836 A2 | 2/1997 |
| WO | 2000061692 A1 | 10/2000 |
| WO | 2014200112 A1 | 12/2014 |
| WO | 2015126780 A1 | 8/2015 |
| WO | 2015182816 A1 | 12/2015 |
| WO | 2015187909 A1 | 12/2015 |
| WO | 2015194654 A1 | 12/2015 |
| WO | 2016175365 A1 | 11/2016 |
| WO | 2017068762 A1 | 4/2017 |
| WO | 2017182638 A1 | 10/2017 |
| WO | 2018169280 A1 | 9/2018 |
| WO | 2019070866 A1 | 4/2019 |
| WO | 2020186127 A1 | 9/2020 |

OTHER PUBLICATIONS

ASTM Standard E-168-16.

Husar, "The formulator's guide to anti-oxygen inhibition additives." Progress in Organic Coatings 2014, 77.11, pp. 1789-1798.

Noll, "Chemistry and Technology of Silicone", Academic Press, 1968, chapter 5, pp. 190-245.

* cited by examiner

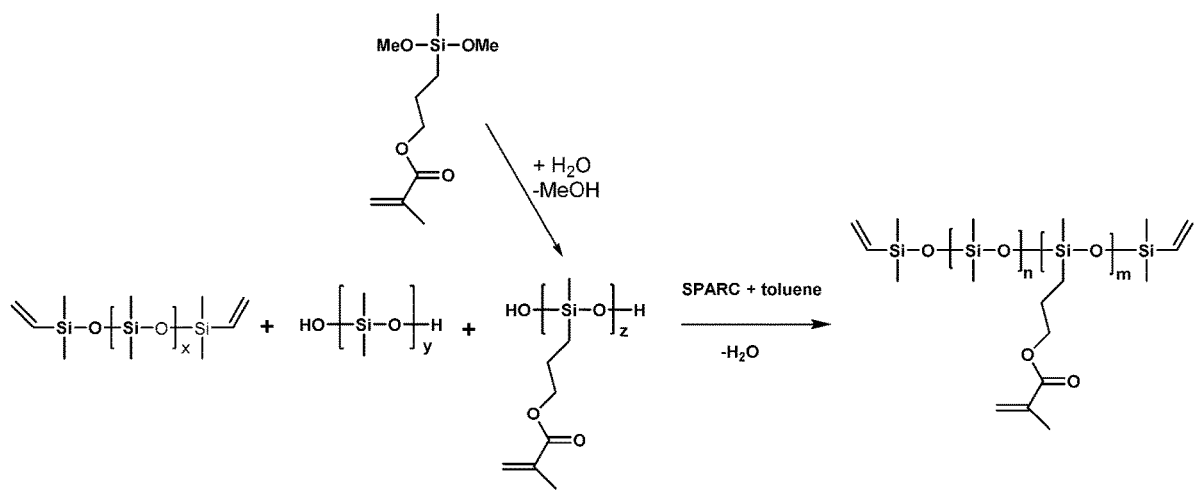

(METH)ACRYLATE FUNCTIONAL SILICONE AND METHODS FOR ITS PREPARATION AND USE

CROSS REFERENCE TO RELATED APPLICATIONS

This application is a U.S. national stage filing under 35 U.S.C. § 371 of PCT Application No. PCT/US21/026944 filed on 13 Apr. 2021, currently pending. which claims the benefit of U.S. Provisional Patent Application No. 63/021,182 filed 7 May 2020 under 35 U.S.C. § 119 (e). PCT Application No. PCT/US21/026944 and U.S. Provisional Patent Application No. 63/021,182 are each hereby incorporated by reference.

TECHNICAL FIELD

This invention relates to a (meth)acrylate functional silicone and methods for its preparation and use.

BACKGROUND

Acrylic chains can be incorporated onto polydimethylsiloxane backbones using free-radical polymerization by performing the polymerization in the presence of mercapto-functional polydimethylsiloxanes. The mercapto group will act as a chain-transfer agent and enable acrylic chains to be grafted onto the polydimethylsiloxane chain as pendant and/or end groups. However, if a mercapto-functional polydimethylsiloxane also contained vinyl or other aliphatically unsaturated monovalent hydrocarbyl functionality, the system may become saturated or crosslinked due to reaction of the aliphatically unsaturated groups during the free radical polymerization. Furthermore, as chain-transfer is a kinetically controlled process, grafting efficiency may be low due to the low level of mercapto-functionalization.

BRIEF SUMMARY OF THE INVENTION

A (meth)acrylate functional silicone and method for its preparation are disclosed. The method comprises hydrolysis of an alkoxysilyl-functional (meth)acrylate monomer, and subsequent condensation of the resulting hydrolysis product with a polyorganosiloxane. The resulting (meth)acrylate functional silicone comprises unit formula: $(R^1_3SiO_{1/2})_p$ $(R^1_2R^3SiO_{1/2})_q(R^1_2SiO_{2/2})_m(R^1R^2SiO_{2/2})_n(R^1R^3SiO_{2/2})_o$ $(R^5SiO_{3/2})_r(SiO_{4/2})_s$, where each $R^1$ is an independently selected monovalent hydrocarbon group free of aliphatic unsaturation, each $R^2$ is an independently selected (meth)acryloxyalkyl functional group, each $R^3$ is an independently selected aliphatically unsaturated monovalent hydrocarbon group, each $R^5$ is independently selected from the group consisting of $R^1$, $R^2$, and $R^3$; and subscripts p, q, m, n, o, r, and s have values such that a quantity $(p+q) \geq 2$, $m > 0$, $n > 2$, $o \geq 0$, $r \geq 0$, and $s \geq 0$.

BRIEF DESCRIPTION OF THE DRAWING

FIG. 1 shows an exemplary reaction scheme used in Examples 1-6 for preparing bis-vinyldimethylsiloxy-terminated (methacryloxypropyl)methylsiloxane-dimethylsiloxane copolymers.

DETAILED DESCRIPTION OF THE INVENTION

The method for preparing a (meth)acrylate functional silicone is provided. The method comprises:
1) combining, under conditions to form a crude hydrolysis product, starting materials comprising
   A) an alkoxysilyl-functional (meth)acrylate monomer,
   B) water, and
   C) a hydrolysis reaction catalyst;
2) refining the crude hydrolysis, thereby forming a refined hydrolysis product;
3) combining, under conditions to form a condensation reaction product, the refined hydrolysis product and starting materials comprising
   D) a polydiorganosiloxane selected from the group consisting of
      D1) an unsaturated polydiorganosiloxane having, per molecule, at least one silicon bonded aliphatically unsaturated group;
      D2) a hydroxyl-functional polydiorganosiloxane having, per molecule, at least two silicon bonded hydroxyl groups, and
      D3) a combination of D1) and D2);
   E) a condensation reaction catalyst;
   optionally F) a polydialkylsiloxane;
   optionally G) a solvent; and
   H) a free radical scavenger; thereby making a condensation reaction product comprising the (meth)acrylate functional silicone and a condensation by-product;
4) refining the condensation reaction product during and/or after step 3);
optionally 5) neutralizing the condensation reaction product; and
optionally 6) recovering the (meth)acrylate functional silicone.

Starting Material A) Alkoxysilyl-Functional (Meth)Acrylate Monomer

Starting material A) in the method described above is an alkoxysilyl-functional (meth)acrylate monomer. The alkoxysilyl-functional (meth)acrylate monomer may have formula A-1): $R^2{}_xR^1{}_ySi(OR^1)_{(4-x-y)}$, where subscript x is 1 or 2, subscript y is 0 or 1, and a quantity (x+y) is 1 to 3; ach $R^1$ is an independently selected monovalent hydrocarbon group free of aliphatic unsaturation, and each $R^2$ is an independently selected (meth)acryloxyalkyl functional group. Alternatively, x may be 1 and y may be 0 or 1, alternatively 0. Alternatively, the alkoxysilyl-functional (meth)acrylate monomer may be a (meth)acryl functional dialkoxysilane of formula $R^2R^1Si(OR^1)_2$.

Suitable monovalent hydrocarbon groups (which are free of aliphatic unsaturation) for $R^1$ in the formulae above include alkyl groups and aryl groups. The alkyl group may be branched, unbranched, or cyclic. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neo-pentyl, and/or tert-pentyl); and hexyl, heptyl, octyl, nonyl, and decyl, as well as branched saturated monovalent hydrocarbon groups of 6 or more carbon atoms; and cyclic alkyl groups such as cyclopentyl or cyclohexyl. Alkyl groups have at least one carbon atom. Alternatively, alkyl groups may have 1 to 18 carbon atoms, alternatively 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

The aryl group includes, alternatively is, a hydrocarbon group derived from an arene by removal of a hydrogen atom from a ring carbon atom. Aryl is exemplified by, but not limited to, phenyl, naphthyl, benzyl, tolyl, xylyl, phenylethyl, phenyl propyl, and phenyl butyl. Aryl groups have at least 5 carbon atoms. Monocyclic aryl groups may have 5 to 12 carbon atoms, alternatively 6 to 9 carbon atoms, and alternatively 6 carbon atoms. Polycyclic aryl groups may have 9 to 17 carbon atoms, alternatively 9 to 14 carbon atoms, and alternatively 9 to 12 carbon atoms. Alternatively, for $R^1$, the alkyl group may be methyl, and the aryl group may be phenyl. Alternatively, each $R^1$ may be an alkyl group, as described above. Suitable (meth)acryloxyalkyl functional groups for $R^2$ in the formulae above may be selected from the group consisting of acryloxypropyl and methacryloxypropyl.

Depending on selection of starting materials, various structures of the (meth)acrylate functional silicone can be obtained. For example, the (meth)acrylate functional silicone may be linear or substantially linear, e.g., when starting material A) is a (meth)acryl functional dialkoxysilane and no additional reactive silane is used in the method. (Meth)acryl functional dialkoxysilanes for starting material A) are known in the art and are commercially available. For example, starting material A) is exemplified by 3-[dimethoxy(methyl)silyl]propyl methacrylate (CAS #14513-34-9) and 3-[dimethoxy(methyl)silyl]propyl acrylate (CAS #13732-00-8).

Starting Material B) Water

Starting material B), the water, is not generally limited, and may be used neat (i.e., absent any solvents), and/or pure (i.e., free from or substantially free from minerals and/or other impurities). For example, the water (B) may be processed or unprocessed before step 1) of the method described above. Examples of processes that may be used for purifying the water include distilling, filtering, deionizing, and combinations of two or more thereof, such that the water (B) may be deionized, distilled, and/or filtered. Alternatively, the water (B) may be unprocessed (e.g. may be tap water, provided by a municipal water system or well water, used without further purification).

The water B) may be used in any amount, which will be selected by one of skill in the art, depending on various factors, e.g., the particular catalyst selected for starting material C), the reaction parameters employed, the scale of the reaction (e.g., total amount of starting material A) to be hydrolyzed).

The relative amounts of the starting materials A) and B) used in step 1) may vary, e.g., based upon the particular alkoxysilyl-functional (meth)acrylate monomer selected for starting material A), the selection and amount of starting material C), and the reaction parameters employed. As understood by those of skill in the art, the hydrolysis of the alkoxysilyl-functional (meth)acrylate monomer with water occurs at a molar ratio monomer:water [i.e., (A):(B) ratio] of 1:1 or 1:>1. An excess of water may be used to fully consume the alkoxysilyl-functional (meth)acrylate monomer.

Starting Material C) Catalyst

Suitable hydrolysis catalysts for use in step 1) of the method described above are acid catalysts, including protic acids and Lewis acids. A "Lewis acid" is any substance that will take up an electron pair to form a covalent bond. Examples of suitable acid catalysts include, for example, boron trifluoride $FeCl_3$, $AlCl_3$, $ZnCl_2$, $ZnBr_2$, catalysts of formula $M^1R^{21}\eta X^2\sigma$ where $M^1$ is B, Al, Ga, In or Ti, each $R^{21}$ is independently the same (identical) or different and represents a monovalent aromatic hydrocarbon radical having from 6 to 14 carbon atoms, such monovalent aromatic hydrocarbon radicals preferably having at least one electron-withdrawing element or group such as $—CF_3$, $—NO_2$ or $—CN$, or substituted with at least two halogen atoms; $X^2$ is a halogen atom; subscript $\sigma$ is 1, 2, or 3; and subscript $\eta$ is 0, 1 or 2; with the proviso that a quantity $(\eta+\sigma)=3$. One example of such a catalyst is $B(C_6F_5)_3$. Alternatively, the acid catalyst may have formula $HX^2$, where $X^2$ is as described above. Alternatively, the acid catalyst may comprise HCl. Alternatively, the catalyst in step 1) may be an acid catalyst as summarized in U.S. Pat. No. 8,076,411 to Maton et al. The catalyst may be used in an amount ranging from 0.0001 mole to 1 mole, per liter of water used; and alternatively, 0.01 mole to 0.1 mole, per liter of water used.

Step 1) of the method for preparing the (meth)acrylate functional silicone comprises hydrolysis of starting material A), e.g., the (meth)acryl functional dialkoxysilane. The reaction may be performed at a reduced temperature. The reduced temperature will be selected and controlled depending on the particular alkoxysilyl functional (meth)acrylate monomer selected for starting material A) and the particular catalyst selected for starting material C). Accordingly, the reduced temperature will be readily selected by one of skill in the art in view of the reaction conditions and parameters selected and the description herein. The reduced temperature may be −78° C. to less than ambient temperature, such as from −30° C. to 25° C., alternatively from −15° C. to 25° C., alternatively from −10° C. to 25° C., alternatively from −10° C. to 20° C., alternatively from −5° C. to 20° C. Alternatively, the reaction may be carried out at a temperature of 0° C.±5° C. (e.g. by use of a circulator or chiller using ice and/or a set point of 0° C.). Alternatively, the reaction may be performed at RT.

It is to be appreciated that the reaction temperature may also differ from the ranges set forth above. Likewise, it is also to be appreciated that reaction parameters may be modified during the reaction of starting materials A) and B) in step 1). For example, temperature, pressure, and other parameters may be independently selected or modified during the reaction. Any of these parameters may independently be an ambient parameter (e.g., RT and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof).

The time in step 1) during which the reaction of starting materials A) and B) to prepare the crude hydrolysis product carried out is a function of various factors including scale, reaction parameters and conditions, and selection of particular starting materials. The time during which the reaction is performed may be >0 to 48 hours, such as from 1 minute to 48 hours. On a relatively large scale (e.g. >1, alternatively >5, alternatively >10, alternatively >50, alternatively >100 kg), the reaction may be carried out for hours, such as 1 to 48, alternatively 1 to 36, alternatively 1.5 to 24, alternatively of 1, 2, 6, 12, 18, 24, 36, or 48 hours, as will be readily determined by one of skill in the art (e.g. by monitoring conversion of starting material A), and/or production of crude hydrolysis product, such as via chromatographic and/or spectroscopic methods). On a relatively small scale (e.g. gram-scale, or <10, alternatively <5, alternatively <1, kg), the reaction may be carried out for a time of from 1 minute to 4 hours, such as from 1 minute to 2 hours, from 5 min to 1.5 hours, or for a time of 60, 90, or 120 minutes.

Step 2) of the method described above comprises removing all or a portion of unreacted starting materials and/or a hydrolysis side product from the crude hydrolysis product. The side product comprises an alcohol, e.g., methanol, when starting material, A) has methoxy groups. Step 2) may be performed concurrently with step 1), after step 1), or both. Step 2) may comprise decreasing the amount of unreacted starting materials and side product in the crude hydrolysis product and/or removing the reaction product itself from the crude hydrolysis product. Any suitable technique may be used. Examples of suitable techniques include distilling, stripping/evaporating, extracting, filtering, washing, partitioning, phase separating, chromatography, and combinations of two or more thereof. As will be understood by those of skill in the art, any of these techniques may be used in combination (e.g., sequentially) with any another technique.

Alternatively, step 2) may comprise distilling and/or stripping volatiles (e.g., water and alcohol) from the crude hydrolysis product during and after step 1). As will be appreciated by those of skill in the art, this stripping and/or distilling the crude hydrolysis product may be performed at an elevated temperature and a reduced pressure. The elevated temperature and reduced pressure are independently selected, depending on various factors e.g. the particular starting materials used, the particular hydrolysis product prepared, and other side product removal techniques utilized, as will be readily determined by those of skill in the art. Alternatively, step 2) may comprise filtration, stripping, and/or distillation. The product of step 2) is a refined hydrolysis product, i.e., comprising the reaction product of starting material A) with water and containing an amount of unreacted starting materials B) and C) and side products less than an amount that would have been present in the absence of step 2).

Step 3) in the method described herein comprises combining, under conditions to form a condensation product, the refined hydrolysis product prepared in step 2) and starting materials comprising D) a polydiorganosiloxane, E) a condensation reaction catalyst, optionally F) a polydialkylsiloxane, optionally G) a solvent, H) a free radical scavenger, optionally I) an endblocker, and optionally J) an additional reactive silane, which is distinct from starting material A).

Starting Material D) Polydiorganosiloxane

Starting material D) used in step 3) of the method for preparing the (meth)acrylate functional silicone is a polydiorganosiloxane selected from the group consisting of D1) an unsaturated polydiorganosiloxane having, per molecule, at least one silicon bonded aliphatically unsaturated group; D2) a hydroxyl-functional polydiorganosiloxane having, per molecule, at least two silicon bonded hydroxyl groups, and D3) a combination of both D1) and D2). When starting material D1) is used, the (meth)acrylate functional silicone has both silicon bonded aliphatically unsaturated groups and silicon bonded poly(meth)acrylate groups.

Starting material D1) is an unsaturated polydiorganosiloxane having, per molecule, at least one silicon bonded aliphatically unsaturated group. The aliphatically unsaturated group may be in a terminal position, a pendant position, or both terminal and pendant positions. Alternatively, the aliphatically unsaturated group may be in a terminal position.

Starting material D1), the unsaturated polydiorganosiloxane, may comprise unit formula D1-1): $(R^3R^1_2SiO_{1/2})_b(R^1_2SiO_{2/2})_c(R^3R^1SiO_{2/2})_d(R^1_3SiO_{1/2})_e(R'OR^1_2SiO_{1/2})_f(R'OR^1SiO_{2/2})_g$, where $R^1$ is as described above, each $R^3$ is an aliphatically unsaturated monovalent hydrocarbon group, each R' is independently selected from the group consisting of H and $R^1$, subscript b is 0, 1, or 2, subscript c≥1, subscript d≥0, subscript e is 0, 1, or 2, subscript f is 0, 1, or 2, and subscript g≥0, with the provisos that a quantity (b+d)≥1, a quantity (b+e+f)=2, and a quantity (b+c+d+e+f+g) is at least 3, alternatively 3 to 250, and alternatively 10 to 60.

Suitable aliphatically unsaturated monovalent hydrocarbon groups for $R^3$ include alkenyl and alkynyl groups. The alkenyl group has a double bond and may be branched or unbranched. Alkenyl groups have at least 2 carbon atoms. Alternatively, alkenyl groups may have 2 to 18 carbon atoms, alternatively 2 to 12 carbon atoms, alternatively 2 to 10 carbon atoms, alternatively 2 to 6 carbon atoms, alternatively 2 to 4 carbon atoms, and alternatively 2 carbon atoms. Suitable alkenyl groups include, but are not limited to vinyl, allyl, and hexenyl; alternatively vinyl and hexenyl. The alkynyl group has a triple bond and may be branched or unbranched. Alkynyl groups have at least 2 carbon atoms. Alternatively, alkynyl groups may have 2 to 18 carbon atoms, alternatively 2 to 12 carbon atoms, alternatively 2 to 10 carbon atoms, alternatively 2 to 6 carbon atoms, alternatively 2 to 4 carbon atoms, and alternatively 2 carbon atoms. Alkynyl groups include ethynyl, propynyl, butynyl, and hexynyl. Alternatively, each aliphatically unsaturated monovalent hydrocarbon group for $R^3$ is an independently selected alkenyl group, which may be selected from the group consisting of vinyl, allyl, and hexenyl; alternatively vinyl and hexenyl.

Alternatively, in unit formula D1-1), subscript b may be 0 or 2, subscript e may be 0 or 2, and subscript f may be 0. Alternatively, subscript c may be 1 to 250, subscript d may be 0 to 1, subscript g may be 0 to 1, and a quantity (c+d+g) may be 1 to 250. Alternatively, the quantity (b+e) may be 2. Alternatively, the quantity (b+g) may be 2. Alternatively, subscript c may be 1 to 100, alternatively 10 to 75, alternatively 25 to 75, and alternatively 30 to 60. Alternatively, subscript d may be 0 to 50, alternatively 0 to 25 alternatively 0 to 10, alternatively 0 to 5. Alternatively, subscript g may be 0 to 50, alternatively 0 to 25 alternatively 0 to 10, alternatively 0 to 5. Subscript b is 0 to 2, alternatively subscript b may be 0, and alternatively subscript b may be 2. Subscript e is 0 to 2, alternatively subscript e may be 0, and alternatively subscript e may be 2. Subscript f is 0 to 2, alternatively subscript f may be 0, and alternatively, subscript f may be 2.

Starting material D1) may contain both silicon bonded aliphatically unsaturated hydrocarbon groups and silicon bonded hydroxyl groups. Examples of starting material D1) containing both silicon bonded aliphatically unsaturated groups and silicon bonded hydroxyl groups include an OH-terminated polymethylvinylsiloxane and an OH-terminated poly(dimethyl/methylvinyl)siloxane copolymer, which is commercially available from Gelest. See for example, "Gelest Reactive Silicones: Forging New Polymer Links", 2016, https://www.gelest.com/wp-content/uploads/Reactive-SIlicones-No-Price-2016.pdf, at page 11. Alternatively, starting material D1) may have silicon bonded aliphatically unsaturated hydrocarbon groups, silicon bonded hydroxyl groups, and silicon bonded alkoxy groups. Examples of such material include DOWSIL™ 4-7042, which is a mixture of hydroxy-terminated, poly(dimethyl, methylvinyl siloxane) and alpha-hydroxy-terminated, omega-methoxy-terminated, poly(dimethyl, methylvinyl siloxane) commercially available from Dow Silicones Corporation of Midland, Michigan, USA. Other examples of starting material D1) include hydroxy-terminated vinylmethylsiloxane-dimethylsiloxane copolymer (CAS #67923-19-7) and hydroxy-terminated polyvinylmethylsiloxane (CAS #68083-20-5). When starting material D1) contains both silicon bonded aliphatically unsaturated hydrocarbon groups and sufficient silicon bonded hydroxyl groups, then starting material D2) the hydroxyl-functional polydiorganosiloxane is optional.

Alternatively, in unit formula D1-1) above, a quantity (f+g) may be less than 2 (such that starting material
D1) may have less than 2 silicon bonded hydroxyl groups per molecule). Examples of suitable unsaturated polydiorganosiloxanes include
D-i) dimethylvinylsiloxy-terminated polydimethylsiloxane,
D-ii) dimethylvinylsiloxy-terminated poly(dimethylsiloxane/methylvinylsiloxane),
D-iii) dimethylvinylsiloxy-terminated polymethylvinylsiloxane,
D-iv) trimethylsiloxy-terminated poly(dimethylsiloxane/methylvinylsiloxane),
D-v) trimethylsiloxy-terminated polymethylvinylsiloxane,
D-vi) dimethylvinylsiloxy-terminated poly(dimethylsiloxane/methylvinylsiloxane),
D-vii) dimethylvinylsiloxy-terminated poly(dimethylsiloxane/methylphenylsiloxane),
D-viii) dimethylvinylsiloxy-terminated poly(dimethylsiloxane/diphenylsiloxane),
D-ix) phenyl,methyl,vinyl-siloxy-terminated polydimethylsiloxane,
D-x) dimethylhexenylsiloxy-terminated polydimethylsiloxane,
D-xi) dimethylhexenylsiloxy-terminated poly(dimethylsiloxane/methylhexenylsiloxane),
D-xii) dimethylhexenylsiloxy-terminated polymethylhexenylsiloxane,
D-xiii) trimethylsiloxy-terminated poly(dimethylsiloxane/methylhexenylsiloxane),
D-xiv) trimethylsiloxy-terminated polymethylhexenylsiloxane
D-xv) dimethylhexenyl-siloxy terminated poly(dimethylsiloxane/methylhexenylsiloxane),
D-xvi) dimethylvinylsiloxy-terminated poly(dimethylsiloxane/methylhexenylsiloxane),
D-xvii) a combination thereof. Vinyl functional polydiorganosiloxanes are available, see for example, "Gelest Reactive Silicones: Forging New Polymer Links", 2016, https://www.gelest.com/wp-content/uploads/Reactive-SIlicones-No-Price-2016.pdf, at pages 8-11 and 15-16. When starting material D1) does not contain sufficient silicon bonded hydroxyl groups, starting material D2) may be used in the method described above. The amount of starting material D1) used in the method depends on various factors including on whether D1) has terminal, pendant, or both terminal and pendant aliphatically unsaturated groups, however, the amount of starting material D1) is sufficient to provide 0.1% to 10%, alternatively 0.1% to 2%, aliphatically unsaturated groups to all of the starting materials in the method for making the (meth)acrylate functional silicone. Alternatively, the amount of starting material D1) may be 0.5% to 5%, alternatively, 1% to 4%, and alternatively 1% to 3%, based on combined weights of starting materials A) and D). Alternatively, starting material D1) can be present in a higher amount, e.g., up to 90% when D1) had hydroxyl functional groups and starting material D2) is not used.

Starting Material D2)

In in step 3) of the method described above, starting material D2) is a hydroxyl-functional polydiorganosiloxane having, per molecule, at least two silicon bonded hydroxyl groups. The hydroxyl groups may be in terminal positions, in pendant positions, or both. Alternatively, the hydroxyl groups may be in terminal positions.

Starting material D2) may comprise unit formula D2-1): $(R^{12}SiO_{2/2})_h(R^1_3SiO_{1/2})_i(HOR^{12}SiO_{1/2})_j$, where $R^1$ is as described above, subscript j is 1 or 2, subscript i is 0 or 1, a quantity (j+i)=2, subscript h≥1, and a quantity (h+i+j) is at least 3, alternatively 3 to 250, and alternatively 3 to 100, and alternatively 10 to 40. Alternatively, subscript h may be 1 to 250, alternatively 1 to 100, and alternatively 10 to 40. Alternatively, subscript i may be 0, and subscript j may be 2. Examples of starting material D2) include hydroxyl-terminated polydimethylsiloxane, hydroxyl-terminated poly(dimethyl/diphenyl)siloxane copolymers, hydroxyl-terminated poly(dimethyl/methylphenyl)siloxane copolymers. Alternatively, suitable bis-hydroxyl terminated polydimethylsiloxanes are commercially available from Dow Silicones Corporation of Midland, Michigan, USA. Exemplary hydroxyl functional polydiorganosiloxanes are commercially available, which include the silanol functional polymers in "Gelest Reactive Silicones: Forging New Polymer Links", 2016, https://www.gelest.com/wp-content/uploads/Reactive-SIlicones-No-Price-2016.pdf, at pages 22 and 24-25. Other hydroxyl-functional polydiorganosiloxanes for starting material D2) include hydroxy-terminated polydimethylsiloxane (CAS #70131-67-8), hydroxy-terminated polyphenylmethylsiloxane (CAS #80801-30-5), and diphenylsilanediol (CAS #947-42-2). Starting material D2) may be used in an amount of 80% to 99.5%, alternatively 85% to 99% based on combined weights of starting materials A) and D); alternatively 87% to 95%, and alternatively 89% to 95%, on the same basis.

Starting material D3) may be a physical mixture of D1) and D2).

Starting Material E) Condensation Reaction Catalyst

In step 3) of the method for preparing the (meth)acrylate functional silicone, starting material E) is a phosphazene condensation reaction catalyst such as a phosphonitrile halide. Without wishing to be bound by theory, it is thought that cyclic siloxane by-products (such as octamethylcyclotetrasiloxane) formation may be minimized when the phosphazene condensation reaction catalyst is used in the method.

Phosphazene condensation reaction catalysts are exemplified by those disclosed in U.S. Pat. No. 9,051,428 to Davio et al. Exemplary phosphazene condensation reaction catalysts may contain, per molecule at least one —(N=P<)- unit and may be an oligomer having up to 10 such phosphazene units, for example having an average of 1.5 to 5 phosphazene units. The phosphazene condensation reaction catalyst can for example be a halophosphazene, such as a chlorophosphazene (phosphonitrile chloride), an oxygen-containing halophosphazene, or an ionic derivative of a phosphazene such as a phosphazenium salt, such as an ionic derivative of a phosphonitrile halide, e.g., a perchlorooligophosphazenium salt.

One suitable type of phosphazene condensation reaction catalyst is an oxygen-containing halophosphazene, such as an oxygen-containing chlorophosphazene. Such an oxygen-containing chlorophosphazene can for example have the formula E-1):

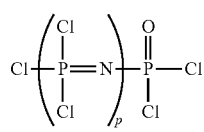

or
E-2):

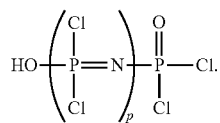

In formula E-1) and E-2), subscript p can have an average value of 1 to 10, alternatively 1 to 5. The catalyst may also comprise tautomers of the catalyst of the formula E-2) Another type of suitable oxygen-containing chlorophosphazene has the formula E-3):

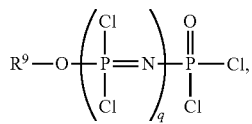

where $R^9$ represents an organosilicon moiety bonded to phosphorus via oxygen, for example a phosphazene catalyst of the formula E-4):

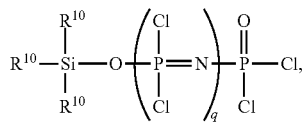

where each $R^{10}$ represents a monovalent hydrocarbon group having 1 to 18 carbon atoms or monovalent halogenated hydrocarbon group having 1 to 18 carbon atoms and subscript q has an average value of 1 to 10, alternatively 1 to 5. The catalyst may also comprise condensation products of such an organosilicon-containing phosphazene. All or some of the chlorine atoms in any of the above oxygen-containing phosphazenes can be replaced by radicals Q, in which Q represents a moiety selected from the group consisting of a hydroxyl group, a monovalent organic group, such as alkoxy or aryloxy, a halogen atom other than chlorine, an organosilicon group, and a phosphorus-containing group.

Another suitable type of phosphazene catalyst is a perchlorooligophosphazenium salt of the formula E-5):

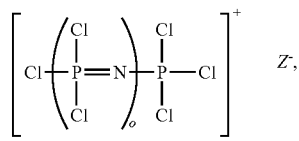

where subscript o has an average value of 1 to 10, and $Z^-$ represents an anion. Alternatively, subscript o may have an average value of 1 to 6, and alternatively, subscript o may have an average value of 2. The anion may be a complex anion and can, for example, be of the formula $MX_{(v+1)}$ in which M is an element having an electronegativity on Pauling's scale of from 1.0 to 2.0 and valency v, and X is a halogen atom. The element M can, for example, be phosphorus or antimony, alternatively phosphorus. The halogen atom for X may be Cl. The anion $Z^-$ can alternatively be a complex anion of the formula $[MX_{(v-y+1)} R^{11}_y]^-$ where each $R^{11}$ is an independently selected alkyl group having 1 to 12 carbon atoms and subscript y has a value between 0 and v, as described in U.S. Pat. No. 5,457,220. Alternatively, in formula E-5), subscript o may have an average value of 2, and the anion $Z^-$ may be $PCl_6^-$.

The phosphazene condensation reaction catalyst may be present in an amount of 1 to 200, alternatively 2 to 200 parts per million based on the combined weight of starting materials A) and D), for example at 5 to 50 parts per million.

Starting Material F) Polydialkylsiloxane

Starting material F) is an optional polydialkylsiloxane that may be added in step I) of the method for making the product comprising the (meth)acrylate functional silicone. The polydialkylsiloxane may comprise unit formula F-1): $(R^{12}_2SiO_{2/2})_k(R^{12}_3SiO_{1/2})_2$, where each $R^{12}$ is an independently selected alkyl group, and subscript k is 1 to 250, alternatively 1 to 50. Suitable alkyl groups for $R^{12}$ include methyl, ethyl, and propyl; alternatively methyl. Examples of starting material F) include Fi) trimethylsiloxy-terminated polydimethylsiloxane, Fii) triethylsiloxy-terminated polydiethylsiloxane, and Fiii) combinations of Fi) and Fii). Polydialkylsiloxanes are known in the art and are commercially available. For example, methyl silicone fluids such as trimethylsiloxy-terminated polydimethylsiloxanes are commercially available from Gelest, see for example, "Gelest: Silicone Fluids," https://www.gelest.com/themencode-pdf-viewer/?file=https://www.gelest.com:443/wp-content/uploads/Inert_Silicones.pdf, 2012, at pages 8-9 and from Dow Silicones Corporation of Midland, Michigan USA under the tradename DOWSIL™ 200 Fluids. Trimethylsiloxy-terminated polydimethylsiloxane and triethylsiloxy-terminated polydiethylsiloxane are available from Power Chemical Corporation of Jiangsu, China. The amount of starting material F) depends on various factors including the molecular weight of the polydialkylsiloxane selected, however, when used, the amount may be 1% to 10% based on weights of starting materials A) and D) used in the method.

Starting Material G) Solvent

Starting material G) is a solvent that may be used in the method described above. The amount and type of solvent are selected so as to solubilize one or more of the starting materials used in step 3), e.g., the refined hydrolysis product of step 2), starting material D) the polyorganosiloxane, and/or starting material E) the condensation reaction catalyst. One or more of the starting materials may be delivered in solvent. Suitable solvents include organic liquids exemplified by, but not limited to, aromatic hydrocarbons, aliphatic hydrocarbons, ketones, esters, ethers. Hydrocarbons include benzene, toluene, xylene, naphtha, hexane, cyclohexane, methylcyclohexane, heptane, octane, decane, hexadecane, isoparaffin such as Isopar L (C11-C13), Isopar H(C11-C12), hydrogenated polydecene. Suitable ketones include, but are not limited to, acetone, methylethyl ketone, 2-pentanone, 3-pentanone, 2-hexanone, 2-heptanone, 4-heptanone, methyl isobutyl ketone, diisobutylketone, acetonylacetone, and cyclohexanone. Esters include ethyl acetate, propyl acetate, isopropyl acetate, butyl acetate, and isobutyl acetate. Ethers include diethyl ether, dipropyl ether, diisopropyl ether, dibutyl ether, 1,2-dimethoxyethane, and 1,4- dioxane. Solvents having both ester and ether moieties include 2-methoxyethyl acetate, 2-ethoxyethyl acetate, propylene glycol monomethyl ether acetate, and 2-butoxyethyl acetate; Ethers and esters further include, isodecyl neopentanoate, neopentylglycol heptanoate, glycol distearate, dicaprylyl carbonate, diethylhexyl carbonate, propylene glycol n-propyl ether, propylene glycol-n-butyl ether, ethyl-3 ethoxypropionate, propylene glycol methyl ether acetate, tridecyl neopentanoate, propylene glycol methylether acetate (PGMEA), octyldodecyl neopentanoate, diisobutyl adipate, diisopropyl adipate, propylene glycol dicaprylate/dicaprate, octyl ether, and octyl palmitate. Alternatively, the solvent may be selected from ketones, tetrahydrofuran, mineral spirits, naphtha, or a combination thereof.

The amount of solvent will depend on various factors including the type of solvent selected and the amount and type of other starting materials selected. However, when present, the solvent may be used in an amount of 30% to 80%, alternatively 40% to 70%, based on combined weights of the refined hydrolysis product of step 2) and starting materials D), E), F), H), and I). Without wishing to be bound by theory, it is thought that the solvent, such as toluene, may be used to reduce the viscosity and/or facilitate the water/methanol removal by azeotropic distillation in step 4) and/or step 6) of the method described herein.

Starting Material H) Free Radical Scavenger

Starting material H) is a free radical scavenger (scavenger) that may be used to control or inhibit polymerization of the (meth)acrylate-functional groups. Scavengers comprising phenolic compounds are one class of such materials that may be used in the method described above, including, for example, 4-methoxyphenol (MEHQ, methyl ether of hydroquinone), hydroquinone, 2-methyl hydroquinone, 2-t-butylhydroquinone, t-butyl catechol, butylated hydroxy toluene, and butylated hydroxy anisole, combinations of two or more thereof. Other scavengers that may be used include phenothiazine and anaerobic inhibitors, such as the NPAL type inhibitors (tris-(N-nitroso-N-phenylhydroxylamine) aluminum salt) from Albemarle Corporation, Baton Rouge, La. Alternatively, the free radical scavenger may be selected from the group consisting of a phenolic compound, phenothiazine and an anaerobic inhibitor.

Free radical scavengers are known, for example, in U.S. Pat. No. 9,475,968, and are commercially available. The amount of scavenger used will depend on various factors including the type and amount of (meth)acryloxyalkyl groups in the refined hydrolysis product of step 2), however the scavenger may be present in an amount of 5 ppm to 2,000 ppm based on weight of the refined hydrolysis product; alternatively 10 ppm to 1,500 ppm on the same basis.

Step 3) of the method for preparing the (meth)acrylate functional silicone comprises condensation reaction of the refined hydrolysis product prepared in step 2) with starting material D) (and the optional additional starting materials, if any are used). The reaction may be performed at an elevated temperature. The elevated temperature will be selected and controlled depending on various factors including the particular polydiorganosiloxane selected for starting material D), the particular condensation reaction catalyst, and amount thereof, selected for starting material E), and whether any optional additional starting materials are used. Accordingly, the elevated temperature will be readily selected by one of skill in the art in view of the reaction conditions and parameters selected and the description herein. The elevated temperature may be >RT to 150° C., such as from 70° C. to 120° C., alternatively from 75° C. to 115° C., alternatively from 75° C. to 90° C., alternatively from 75° C. to 85° C., alternatively from 90° C. to 120° C.

It is to be appreciated that the reaction temperature may also differ from the ranges set forth above. Likewise, it is also to be appreciated that reaction parameters may be modified during the condensation reaction in step 3). For example, temperature, pressure, and other parameters may be independently selected or modified during the reaction. Any of these parameters may independently be an ambient parameter (e.g., RT and/or atmospheric pressure) and/or a non-ambient parameter (e.g. elevated temperature and/or reduced or reduced pressure). Any parameter, may also be dynamically modified, modified in real time, i.e., during the method, or may be static (e.g. for the duration of the reaction, or for any portion thereof).

The time in step 3) during which the condensation reaction is carried out is a function of various factors including scale, reaction parameters and conditions, and selection of particular starting materials. The time during which the reaction is performed may be >0 to 48 hours, such as from 1 minute to 48 hours. On a relatively large scale (e.g. >1, alternatively >5, alternatively >10, alternatively >50, alternatively >100 kg), the reaction may be carried out for hours, such as 1 to 48, alternatively 1 to 36, alternatively 1.5 to 24, alternatively of 1, 2, 6, 12, 18, 24, 36, or 48 hours, as will be readily determined by one of skill in the art (e.g. by monitoring conversion of starting material D), and/or production of (meth)acrylate functional silicone, such as via chromatographic and/or spectroscopic methods). On a relatively small scale (e.g. gram-scale, or <10, alternatively <5, alternatively <1, kg), the reaction may be carried out for a time of from 1 minute to 4 hours, such as from 1 minute to 2 hours, from 5 min to 1.5 hours, or for a time of 60, 90, or 120 minutes.

Step 4) of the method comprises removing all or a portion of the condensation by-product during and/or after step 3). Step 4) may be performed concurrently with step 3), after step 3) or both. Step 4) may comprise decreasing the amount of unreacted starting materials and by-product in the condensation reaction product) and/or removing the (meth)acrylate functional silicone itself from the condensation reaction product. Any suitable technique may be used, such as those described above for step 2). For example, step 4) may comprise filtration, stripping, and/or distillation.

Step 5) of the method described above is optional and comprises neutralizing the condensation reaction product. Step 5) may be performed before or after step 4). Starting material K) is a neutralizing agent that may be used in the method. Starting material K) may be used to neutralize the condensation reaction product formed in step 3). If a neutralizing agent is used, any neutralizing agent suitable for the catalyst chosen can be used, see for example the neutralizing agents disclosed in U.S. Pat. No. 8,580,862. Without wishing to be bound by theory, it is thought that selection of neutralizing agent depends on pKa and solubility. Suitable neutralizing agents for phosphazene-based condensation catalysts include, but are not limited to, alkylamines such as trioctylamine, trimethylamine, triethylamine, trihexylamine, and triisononylamine. Neutralizing agents are known in the art and are commercially available, e.g., from Millipore Sigma of St. Louis, Missouri, USA. The amount of neutralizing agent depends on various factors including the amount of E) the condensation reaction catalyst, however, starting the neutralizing may be present in an amount sufficient to provide a molar ratio of neutralizing agent to condensation reaction catalyst (K:E ratio) of 1:1 to 100:1, alternatively 1:1 to 30:1; alternatively 1:1 to 20:1; and alternatively 1:1 to 15:1.

Step 6) of the method is optional, and may be included after step 5) when step 5) is present after step 4). Step 6) comprises recovering the (meth)acrylate functional silicone. Recovering may be performed as described above for steps 2) and 4). Additionally, step 6) may comprise filtration to remove solids. For example, when step 6) is present, step 6) may comprise filtration, stripping, and/or distillation.

(Meth)Acrylate Functional Silicone

The method described above produces the (meth)acrylate functional silicone. The (meth)acrylate functional silicone may comprise unit formula: $(R^1_3SiO_{1/2})_p(R^1_2R^3SiO_{1/2})_q(R^1_2SiO_{2/2})_m(R^1R^2SiO_{2/2})_n(R^1R^3SiO_{2/2})_o(R^5SiO_{3/2})_r(SiO_{4/2})_s$, where $R^1$, $R^2$, and $R^3$ are as described above, each $R^5$ is independently selected from the group consisting of $R^1$, $R^2$, and $R^3$, and subscripts p, q, m, n, o, r, and s have values such that a quantity $(p+q) \geq 2$, $0 < m < 10,000$, $2 < n \leq 10,000$, $o \geq 0$, $0 \leq r \leq 100$, and $0 \leq s \leq 100$. A quantity $(p+q+m+n+o+r+s)$ has a value $\geq 3$, alternatively $3 \leq (p+q+m+n+o+r+s) \leq 10,000$. The (meth)acrylate functional silicone may optionally further comprise small amounts of units of formula MOH, where MOH has formula $[R^1_2(HO)SiO_{1/2}]$, where $R^1$ is described above. Without wishing to be bound by theory, it is thought that a small amount of terminal MOH residuals as impurity may be present in this (meth)acrylate functional silicone, although MOH incorporation is not intended during synthesis, and the hydroxyl group is not expected to significantly impact use of the (meth)acrylate functional silicone.

Alternatively, the (meth)acrylate functional silicone may contain 70 mol % or greater, alternatively 80 mol % or greater, of $R^1$ based on combined amounts of $R^1$, $R^2$, and $R^3$; and each $R^1$ may be methyl. Alternatively, $R^2$ may be present in a mole % of 0.1% to 24% based on combined amounts of $R^1$, $R^2$, and $R^3$. Alternatively, $R^2$ may be present in a mole % of 0.8% to 12%. Alternatively, $R^2$ may be present in a mole % of 1.3% to 6%. Alternatively, $R^2$ may be present in a mole % of 0.5% to 10% based on combined amounts of $R^1$, $R^2$, and $R^3$. Alternatively, $R^2$ may be present in a mole % of 0.5% to 5%. Alternatively, $R^2$ may be present in a mole % of 1.5% to 3.1%, on the same basis. Alternatively, the (meth)acrylate functional silicone may contain 0 to 5 mol %, alternatively 0.001 to 3 mol %, alternatively 0.001 to 0.2 mol %, of $R^3$, based on combined amounts of $R^1$, $R^2$, and $R^3$.

Alternatively, in the unit formula above, a quantity $(m+n+o)$ may be 100 to 10,000, and a ratio $(m+o)/n$ may be 1/1 to 500/1. When the (meth)acrylate functional silicone has aliphatically unsaturated groups, a quantity $(q+o)>0$. Alternatively, the (meth)acrylate functional silicone may have subscripts such that a ratio $(m+n+o)/(r+s)$ is 100/1 to 10,000/1 if $0 < r$ or if $0 < s$.

When the (meth)acrylate functional silicone has subscript p=2, and subscripts o=q=r=s=0, the (meth)acrylate functional silicone may comprise unit formula $(R^1_3SiO_{1/2})_2(R^1_2SiO_{2/2})_m(R^1R^2SiO_{2/2})_n$, where subscripts m and n are as described above. Alternatively, a quantity (m+n) may be 100 to 10,000, and a ratio m/n may be 1/1 to 500/1. Alternatively, the quantity (m+n) may be 200 to 9,900. Alternatively, the quantity (m+n) may be 700 to 7,000; and alternatively 500 to 900. Alternatively, the quantity (m+n) may be 1,000 to 5,000. Alternatively, the ratio m/n may be 4/1 to 99/1; and alternatively 4/1 to 30/1.

When the (meth)acrylate functional silicone has subscript q=2, and subscripts o=p=r=s=0, the (meth)acrylate functional silicone may comprise unit formula $(R^1_2R^3SiO_{1/2})_2(R^1_2SiO_{2/2})_m(R^1R^2SiO_{2/2})_n$, where subscripts m and n are as described above. Alternatively, a quantity (m+n) may be 100 to 10,000, and a ratio m/n may be 1/1 to 500/1. Alternatively, the quantity (m+n) may be 200 to 9,900. Alternatively, the quantity (m+n) may be 700 to 7,000; and alternatively 500 to 900. Alternatively, the quantity (m+n) may be 1,000 to 5,000. Alternatively, the ratio m/n may be 4/1 to 99/1; and alternatively 4/1 to 30/1.

Examples of the (meth)acrylate functional silicone that may be prepared as described herein include one or more of the following average composition formulas: average formulas I) to XI), below). In the average composition formulas, the subscripts after each unit represent average number of that unit per molecule.

I) $ViMe_2SiO(MaMeSiO)_{10}(Me_2SiO)_{1000}SiMe_2Vi$,

II) $ViMe_2SiO(MaMeSiO)_{50}(Me_2SiO)_{2000}SiMe_2Vi$,

III) $ViMe_2SiO(MaMeSiO)_{500}(Me_2SiO)_{6000}SiMe_2Vi$,

IV) $ViMe_2SiO(MaMeSiO)_{1000}(Me_2SiO)_{6000}SiMe_2Vi$,

V) $ViMe_2SiO(MaMeSiO)_{50}(Me_2SiO)_{1990}(ViMeSiO)_{200}SiMe_2Vi$,

VI) $Me_3SiO(MaMeSiO)_{50}(Me_2SiO)_{1990}(ViMeSiO)_{200}SiMe_3$,

VII) $Me_3SiO(MaMeSiO)_{50}(Me_2SiO)_{1990}(HexMeSiO)_{50}SiMe_3$,

VIII) $Me_3SiO(MaMeSiO)_{50}(Me_2SiO)_{1990}(HexMeSiO)_{50}SiMe_3$,

IX) $ViMe_2SiO(MaMeSiO)_{1000}(Me_2SiO)_{6000}(PhMeSiO)_{100}SiMe_2Vi$

X) $(ViMe_2SiO_{1/2})_3(MaMeSiO_{2/2})_{100}(Me_2SiO_{2/2})_{1900}(MeSiO_{3/2})$,

XI) $(Me_3SiO_{1/2})_4(MaMeSiO_{2/2})_{50}(Me_2SiO_{2/2})_{3960}(SiO_{4/2})$, and XII) $(Me_3SiO_{1/2})_3(MaMeSiO_{2/2})_{20}(Me_2SiO_{2/2})_{1979}(ViMeSiO)_{100}(MeSiO_{3/2})$; where Hex represents hexenyl, Me represents methyl, Ma represents methacryloxypropyl, and Vi represents vinyl.

EXAMPLES

These examples are intended to illustrate some embodiments of the invention and should not be interpreted as limiting the scope of the invention set forth in the claims. More specifically, FIG. 1 shows an exemplary reaction scheme used in Examples 1-6 for preparing bis-vinyldimethylsiloxy-terminated (methacryloxypropyl)methylsiloxane-dimethylsiloxane copolymers, which exemplify the (meth)acrylate functional silicones prepared and used according to the methods described herein. Starting materials used in these examples are described in Table 1. C-?R M

TABLE 1

Starting Materials Used in the Examples

| Starting Material | Chemical Description | Source |
|---|---|---|
| DOWSIL™ Z-6033 | 3-methacryloxypropylmethyldimethoxysilane with CAS#14513-34-9, supplied from Dow Silicone Toray | Dow Silicones |
| OH terminated PDMS | bis-hydroxy-terminated polydimethylsiloxane with DP of 30 and CAS#70131-67-8 | Dow Silicones |
| DOWSIL™ 4-2737 | Bis-hydroxy-terminated polydimethylsiloxane with CAS# 70131-67-8 | Dow Silicones |
| Bis-Vi terminated PDMS | bis-dimethylvinylsiloxy-terminated polydimethylsiloxane CAS#68083-19-2 | Dow Silicones |
| Vi terminated PDMS | Bis-vinyldimethylsiloxy-terminated polydimethylsiloxane with DP = 50 | Dow Silicones |
| DOWSIL™ 3-0226 Catalyst | partially hydrolysed dichlorophosphazene oligomer of formula $$\left[Cl-\left(\begin{array}{c}Cl\\|\\P=N\\|\\Cl\end{array}\right)_o\begin{array}{c}Cl\\|\\P-Cl\\|\\Cl\end{array}\right]^+ Z^-$$ where subscript o has an average value of 2 and $Z^-$ is $PCl_6^-$ (CAS# 1391992-23-6) | Dow Silicones |
| DVTMDZ | 1,3-Divinyl-1,1,3,3-tetramethyldisilazane (CAS# 7691-02-3) | Sigma-Aldrich |
| MEHQ | 4-Methoxyphenol CAS# 150-76-5 | Sigma-Aldrich |
| Solvent 1 | Toluene | Sigma-Aldrich |
| Solvent 2 | dichloromethane | |
| Neutralizer 1 | Trihexylamine | |
| Neutralizer 2 | Trioctyl amine | Sigma-Aldrich |

Starting materials branded DOWSIL™ are commercially available from Dow Silicones Corporation and/or its subsidiaries.

In this Example 1, a bis-vinyl-terminated poly(dimethyl/methyl,methacryloxypropyl)siloxane copolymer shown as A-1 in Table 2, below, was synthesized as follows. To a 4-neck 1 liter round bottom flask 3-methacryloxypropyl methyl dimethoxysilane (120.00 g, DOWSIL™ Z-6033) and 0.1N HCl (128.87 g) were added and mixed using a magnetic stir bar at ~23° C. Using a simple distillation glassware setup vacuum was pulled to ~20 mmHg for 1.5 hours. After 1.5 hours the vacuum was released and bis-hydroxy-terminated polydimethylsiloxane (786.50 g, OH terminated PDMS in Table 1) along with 0.23 g of MEHQ were added to the reaction solution. The magnetic stir bar was removed and a Teflon paddle with a glass stir rod was used to mix the solution. Vacuum was pulled to −5 mmHg and the reaction was heated to 80° C. for 1.5 hours. The simple distillation glassware setup was dissembled, and a Dean Stark distillation setup was used for the last reaction step. To the reaction solution, Solvent 1 toluene 80 g, Sigma-Aldrich) and 2.87 g bis-Vi-terminated PDMS were added. The solution was then heated to 111-115° C., with 0.3 mL of phosphazene catalyst (DOWSIL™ 3-0226) being added at 90° C. The overheads were collected in the Dean Stark trap and an additional 0.3 mL of phosphazene catalyst (DOWSIL™ 3-0226) was added. The solution was held at toluene reflux for 1 hour. The heat was removed, and the solution was cooled. At ~60° C., trihexylamine (0.3 g, Sigma Aldrich) was added to the reaction solution and mixed for 2 hours. And, the solution was heated to 120° C. with nitrogen/2% oxygen gas bubbling for 1 hours and cooled to RT. The solid content of the solution was adjusted to 75% by adding additional toluene. Then, the product dissolved in toluene was obtained. Based on $^{13}C$- and $^{29}Si$-NMR analysis, the obtained bis-vinyldimethylsiloxy-terminated poly(dimethyl/methyl,methacryloxypropyl)siloxane copolymer comprised the following unit formula: $(R^4_3 SiO_{1/2})_{0.00071} (R^4_2SiO_{2/2})_{0.99929}$; where each $R^4$ was independently selected from methyl, methacryloxypropyl, and vinyl; and the subscripts represent mole fractions. The methacryl content was 2.406 mole % of total $R^4$, the vinyl content was 0.012 mole % of total $R^4$, and the methyl content was 97.582 mole % of total $R^4$. The m/n ratio is 20/1. GPC Analysis of this polyorganosiloxane (A-1 in Table 2, below) showed it had [Methacryl Content=0.604 mmol/g, Vi Content=0.009 mmol/g, Total Reactive group=0.613 mmol/g]. The obtained bis-vinyldimethylsiloxy-terminated poly(dimethyl/methyl, methacryloxypropyl)siloxane copolymer can also be expressed as unit formula: $(ViMe_2SiO)_2(MaMeSiO)_{136}(Me_2SiO)_{2679}$.

In this Example 2, a bis-vinyl-terminated poly(dimethyl/methyl,methacryloxypropyl)siloxane copolymer shown as A-2 in Table 2, below, was synthesized as follows. To a 4-neck 1 liter round bottom flask 3-methacryloxypropyl methyl dimethoxysilane (50.78 g, DOWSIL™ Z-6033) and 0.1N HCl (45.45 g) were added and mixed using a magnetic stir bar at ~23° C. Using a simple distillation glassware setup vacuum was pulled to ~20 mmHg for 1.5 hours. After 1.5 hours the vacuum was released and bis-hydroxyl-terminated polydimethylsiloxane (550.00 g, OH Terminated PDMS in Table 1) along with 0.16 g of MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (300 g, Sigma-Aldrich) and 2 g bis-Vi-terminated PDMS were added. The solution was then heated to 111-115° C., with 0.4 mL of phosphazene catalyst (DOWSIL™ 3-0226) being added at 90° C. The overheads were collected in the Dean Stark trap and an additional 0.4 mL of phosphazene catalyst (DOWSIL™ 3-0226) was added. The solution was held at toluene reflux for 1 hour. The heat was removed, and the solution was cooled. At ~60° C., DVTMDZ (1 g, Sigma Aldrich) was added to the reaction solution and mixed for 2 hours. And, the solution was heated to 120° C. with nitrogen/2% oxygen gas bubbling for 1 hours and cooled to RT with gas bubbling. The solid content of the solution (which was measured the weight before and after drying 150° C. for 1 hour) was adjusted to 75% by adding additional toluene. Then, the product dissolved in toluene was obtained. Based on $^{13}$C- and $^{29}$Si-NMR analysis, the obtained bis-dimethylvinylsiloxy-terminated poly(dimethyl/methyl,methacryloxypropyl) siloxane copolymer comprised the following average unit formula: $(R^4_3 SiO_{1/2})_{0.00091}(R^4_2SiO_{2/2})_{0.99909}$; where each $R^4$ was independently selected from methyl, methacryloxypropyl, and vinyl; and the subscripts represented mole fractions. The methacryl content was 1.325 mole % of total $R^4$, the vinyl content was 0.015 mole % of total $R^4$, and the methyl content was 98.660 mole % of total $R^4$. The m/n ratio is 37/1. GPC Analysis of this polyorganosiloxane (A-2 in Table 2, below) showed it had Mw=228,772, Mn=106,086, and PD=2.156. [Methacryl Content=0.343 mmol/g, Vi Content=0.012, total reactive group=0.355]. Alternatively, the obtained bis-dimethylvinylsiloxy-terminated poly(dimethyl/methyl,methacryloxypropyl)siloxane copolymer could be shown with the average unit formula $(ViMe_2SiO)_2(MaMeSiO)_{58}(Me_2SiO)_{2130}$.

In this Example 3, a bis-vinyldimethylsiloxy-terminated poly(dimethyl/methyl,methacryloxypropyl)siloxane copolymer shown as A-3 in Table 2, below, was synthesized as follows. To a 4-neck 1 liter round bottom flask 3-methacryloxypropyl methyl dimethoxysilane (33.3 g, DOWSIL™ Z-6033) and 0.1N HCl (45.45 g) were added and mixed using a magnetic stir bar at room temperature (~23° C.). Using a simple distillation glassware setup vacuum was pulled to ~20 mmHg for 1.5 hours. After 1.5 hours the vacuum was released and 600 g OH terminate PDMS along with 0.23 g of MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (300 g, Sigma-Aldrich) and 2.2 g bis-Vi-terminated PDMS were added. The solution was then heated to 111-115° C., with 0.4 mL of phosphazene catalyst (DOWSIL™ 3-0226) being added at 90° C. The overheads were collected in the Dean Stark trap and an additional 0.4 mL of phosphazene catalyst (DOWSIL™ 3-0226) was added. The solution was held at toluene reflux for 1 hour. The heat was removed, and the solution was cooled. At ~60° C., DVTMDZ (1 g, Sigma Aldrich) was added to the reaction solution and mixed for 2 hours. And, the solution was heated to 120° C. with nitrogen/2% oxygen gas bubbling for 1 hours and cooled to RT with gas bubbling. The solid content of the solution was adjusted to 75% by adding additional toluene. Then, the product dissolved in toluene was obtained. Based on $^{13}$C- and $^{29}$Si-NMR analysis, the obtained bis-vinyldimethylsiloxy-terminated poly(dimethyl/methyl,methacryloxypropyl)siloxane copolymer comprised the following average unit formula: $(R^4_3 SiO_{1/2})_{0.00035}(R^4_2SiO_{2/2})_{0.99965}$; where each $R^4$ was independently selected from methyl, methacryloxypropyl, and vinyl; and the subscripts represent mole fractions. The methacryl content was 0.876 mole % of total $R^4$, the vinyl content was 0.006 mole % of total $R^4$, and the methyl content was 99.1187 mole % of total $R^4$. The m/n ratio is 56/1. GPC Analysis of this polyorganosiloxane (A-3 in Table 2, below) showed it had Mw=304,528, Mn=144,937, and PD=2.101. [Methacryl Content=0.230 mmol/g, Vi Content=0.005 mmol/g, Total Reactive group=0.235 mmol/g]. Alternatively, the obtained a bis-vinyldimethylsiloxy-terminated poly(dimethyl/methyl,methacryloxypropyl)siloxane copolymer could be shown as: $(ViMe_2SiO)_2(MaMeSiO)_{100}(Me_2SiO)_{5610}$.

In this Example 4, a bis-vinyl-terminated poly(dimethyl/methyl,methacryloxypropyl)siloxane copolymer shown as A-4 in Table 2, below, was synthesized as follows. To a 4-neck 1 liter round bottom flask 3-methacryloxypropyl methyl dimethoxysilane (13.7 g, DOWSIL™ Z-6033) and 0.1N HCl (24.37 g) were added and mixed using a magnetic stir bar at ~23° C. Using a simple distillation glassware setup vacuum was pulled to ~20 mmHg for 1.5 hours. After 1.5 hours the vacuum was released and bis-hydroxyl-terminated polydimethylsiloxane (1179.49 g, OH terminated PDMS) along with 0.34 g of MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, toluene (550 g, Sigma-Aldrich) and 2.2 g bis-Vi-terminated PDMS were added. The solution was then heated to 111-115° C., with 0.1 mL of phosphazene catalyst (DOWSIL™ 3-0226) being added at 90° C. The overheads were collected in the Dean Stark trap and an additional 0.1 mL of phosphazene catalyst (DOWSIL™ 3-0226) was added. The solution was held at toluene reflux for 1 hour. The heat was removed, and the solution was cooled. At ~60° C., DVTMDZ (0.3 g, Sigma Aldrich) was added to the reaction solution and mixed for 2 hours. And, the solution was heated to 120° C. with nitrogen/2% oxygen gas bubbling for 1 hour and cooled to RT. The solid content of the solution was adjusted to 75% by adding additional toluene. Then, the product dissolved in toluene was obtained. Based on $^{13}$C- and $^{29}$Si-NMR analysis, the obtained bis-vinyldimethylsiloxy-terminated poly(dimethyl/methyl,methacryloxypropyl) siloxane copolymer comprised the following average unit formula: $(R^4_3 SiO_{1/2})_{0.00074}(R^4_2SiO_{2/2})_{0.99926}$; where each $R^4$ was independently selected from methyl, methacryloxypropyl, and vinyl; and the subscripts represented mole fractions. The methacryl content was 0.192 mole % of total $R^4$, the vinyl content was 0.012 mole % of total $R^4$, and the methyl content was 99.796 mole % of total $R^4$. The m/n ratio is 260/1. GPC Analysis of this polyorganosiloxane (A-4 in Table 2, below) showed it had [Methacryl Content=0.051 mmol/g, Vi Content=0.010 mmol/g, Total Reactive group=0.061 mmol/g]. Alternatively, the obtained bis-vinyldimethylsiloxy-terminated poly(dimethyl/methyl,methacryloxypropyl)siloxane copolymer could be shown as $(ViMe_2SiO)_2ViMe_2SiO(MaMeSiO)_{10}(Me_2SiO)_{2679}$.

In this Example 5, a bis-vinyldimethylsiloxy-terminated poly(dimethyl/methyl,methacryloxypropyl)siloxane copolymer shown as A-5 in Table 2, below, was synthesized as follows. To a 4-neck 1 liter round bottom flask 3-methacryloxypropyl methyl dimethoxysilane (4.5 g, DOWSIL™ Z-6033) and 0.1N HCl (4.55 g) were added and mixed using a magnetic stir bar at room temperature (~23° C.). Using a simple distillation glassware setup vacuum was pulled to −20 mmHg for 1.5 hours. After 1.5 hours the vacuum was released and dimethyl siloxane, silanol terminated (786.5 g, OH Terminated PDMS in Table 1) along with 0.23 g of (G-1) MEHQ were added to the reaction solution. The magnetic stir bar was removed and a Teflon paddle with a glass stir rod was used to mix the solution. Vacuum was pulled to −5 mmHg and the reaction was heated to 80° C. for 1.5 hours. The simple distillation glassware setup was dissembled, and a Dean Stark distillation setup was used for the last reaction step. To the reaction solution, (H-1) toluene (450 g, Sigma-Aldrich) and 5 g bis-Vi-terminated PDMS were added. The solution was then heated to 111-115° C., with 0.1 mL of phosphazene catalyst (DOWSIL™ 3-0226) being added at 90° C. The overheads were collected in the Dean Stark trap and an additional 0.1 mL of phosphazene catalyst (DOWSIL™ 3-0226) was added. The solution was held at toluene reflux for 1 hour. There was ~80 g of overheads collected. The heat was removed, and the solution was cooled. At ~60° C., DVTMDZ (0.3 g, Sigma Aldrich) was added to the reaction solution and mixed for 2 hours. The solid content of the solution was adjusted to 75% by adding additional toluene. Then, the product dissolved in toluene was obtained. Based on $^{13}C$- and $^{29}Si$-NMR analysis, the obtained bis-vinyldimethylsiloxy-terminated poly(dimethyl/methyl,methacryloxypropyl)siloxane copolymer comprised the following average unit formula: $(R^4_3SiO_{1/2})_{0.00074}$ $(R^4_2SiO_{2/2})_{0.99926}$, where each $R^4$ was independently selected from methyl, methacryloxypropyl, and vinyl, and the subscripts represented mole fractions. The methacryl content was 0.097 mole % of total $R^4$, the vinyl content was 0.022 mole % of total $R^4$, and the methyl content was 99.881 mole % of total $R^4$. The m/n ratio is 512/1. GPC Analysis of this polyorganosiloxane (A-5 in Table 2, below) showed it had [Methacryl Content=0.025 mmol/g, Vi Content=0.017 mmol/g, Total Reactive group=0.043 mmol/g] The obtained bis-vinyldimethylsiloxy-terminated poly(dimethyl/methyl, methacryloxypropyl)siloxane copolymer can also be expressed as unit formula: $(ViMe_2SiO)_2(MaMeSiO)_3$ $(Me_2SiO)_{1536}$.

TABLE 2 summarizes the (meth)acrylate functional silicones prepared as described above in Examples 1-5

| | | |
|---|---|---|
| A-1 | 75% of Bis-vinyldimethylsiloxy--terminated (methacryloxypropyl)methylsiloxane – dimethylsiloxane copolymer in toluene, DP = 2815, m/n Ratio = 20/1 [Ma Content = 0.604 mmol/g, Vi Content = 0.009 mmol/g, Total Reactive group = 0.613 mmol/g in solid] | See Example 4 for Synthesis |
| A-2 | 75% of Bis- vinyldimethylsiloxy-terminated (methacryloxypropyl)methylsiloxane – dimethylsiloxane copolymer in toluene, DP = 2188, m/n Ratio = 37/1 [Ma Content = 0.343 mmol/g, Vi Content = 0.012, Total reactive group = 0.355 in solid] | See Example 1 for Synthesis |
| A-3 | 75% of Bis-vinyldimethylsiloxy-terminated (methacryloxypropyl)methylsiloxane – dimethylsiloxane copolymer in toluene, DP = 5710, m/n Ratio = 56/1 [Ma Content = 0.230 mmol/g, Vi Content = 0.005 mmol/g, Total Reactive group = 0.235 mmol/g in solid] | See Example 2 for Synthesis |
| A-4 | 75% of Bis-vinyldimethylsiloxy-terminated (methacryloxypropyl)methylsiloxane – dimethylsiloxane copolymer in toluene, DP = 2689, m/n Ratio = 260/1 [Ma Content = 0.051 mmol/g, Vi Content = 0.010 mmol/g, Total Reactive group = 0.061 mmol/g in solid] | See Example 3 for Synthesis |
| A-5 | 75% of Bis-vinyldimethylsiloxy-terminated (methacryloxypropyl)methylsiloxane – dimethylsiloxane copolymer in toluene, DP = 2560, m/n Ratio = 521/1 [Ma Content = 0.026 mmol/g, Vi Content = 0.010 mmol/g, Total Reactive group = 0.037 mmol/g in solid] | See Example 5 for Synthesis |

In this Reference Example 6, several bis-vinyldimethylsiloxy-terminated poly(dimethyl/methyl,methacrylate)siloxane copolymers were prepared according to the following general procedure using the starting materials in Table 3, below. To a four neck 1 liter round bottom flask 3-Methacryloxypropyl Methyl Dimethoxysilane (Z-6033) and 0.1N HCl were added and mixed using a magnetic stir bar. A simple distillation glassware setup was used to remove methanol and water by pulling vacuum at ~20 mmHg at room temperature for 1-2 hours.

After this, the vacuum was broken and bis-hydroxyl-terminated polydimethylsiloxane (4-2737LC) and 4-Methoxyphenol (MEHQ) were added to the reaction flask. The magnetic stir bar was removed, and a glass stir rod and Teflon paddle was added to the glassware setup. The reaction temperature was increased to 75-80° C. and vacuum was pulled to <10 mmHg for 1-2 hours.

Next, vacuum was broken and toluene and bis-dimethylvinylsiloxy-terminated polydimethylsiloxane (Vi terminated PDMS in Table 1) were added to the reaction solution. The simple distillation glassware setup was changed to a Dean Stark setup and the temperature was increased to 135° C. At ~90° C. 0.6 mL of a 1% solution of DOWSIL™ 3-0226 Catalyst in dichloromethane was added to the reaction solution. The methanol, water, and toluene overheads were collected in the Dean Stark trap.

After overheads were collected, and the overhead solution was clear at the top of the Dean Stark trap, an additional amount of a 1% solution of DOWSIL™ 3-0226 Catalyst in dichloromethane was added to the reaction solution. The Dean Stark distillation continued with toluene being allowed to follow back into the reaction solution for 1-2 hours. The peak temperature was 115° C. The heat was then removed and once the temperature was below 60° C., trioctylamine was added to neutralize the catalyst. The final solution was then collected. The NVC for each sample was tested by measuring the weight loss of 2 grams of material, heated to 150° C. for 2 hours. The DP was determined by utilizing $^{29}$Si NMR analysis and reported in Table 3. Values in Table 3 are in grams unless otherwise indicated.

TABLE 3

(Meth)acrylate functional Silicones Prepared According to Reference Example 6

| Sample | 6-1 | 6-2 | 6-3 | 6-4 | 6-5 | 6-6 |
|---|---|---|---|---|---|---|
| Z-6033 | 50.77 | 27.14 | 92.44 | 27.38 | 50.77 | 93.43 |
| 0.1N HCl | 43.23 | 23.93 | 78.79 | 24.02 | 43.23 | 78.79 |
| 4-2737LC | 256.59 | 256.31 | 255.2 | 255.33 | 256.11 | 255.35 |
| MEHQ | 0.08 | 0.11 | 0.13 | 0.08 | 0.09 | 0.09 |
| toluene | 270.51 | 243.03 | 255.39 | 231.72 | 272.74 | 224.71 |
| Vi terminated PDMS | 7.90 | 7.88 | 8.01 | 11.82 | 11.81 | 11.99 |
| Overheads Collected | 61.12 | 58.44 | 54.59 | 48.74 | 61.09 | 33.68 |
| Additional catalyst solution (mL) | 0.6 | 0.6 | 0.6 | 0.5 | 0.6 | 0.6 |
| Trioctylamine (uL) | 370 | 370 | 370 | 310 | 370 | 370 |
| NVC (weight %) | 57.54% | 58.4 | 58.67 | 55.75 | 54.96 | 64.22 |
| DP (no units) | 2387 | 2039 | 1963 | 1363 | 1437 | 1442 |

INDUSTRIAL APPLICABILITY

The (meth)acrylate functional silicones described herein may be used in methods for preparing silicone hybrid pressure sensitive adhesive compositions.

Usage of Terms

The BRIEF SUMMARY OF THE INVENTION and ABSTRACT are hereby incorporated by reference. All amounts, ratios, and percentages are by weight unless otherwise indicated by the context of the specification. The articles 'a', 'an', and 'the' each refer to one or more, unless otherwise indicated by the context of the specification. The disclosure of ranges includes the range itself and also anything subsumed therein, as well as endpoints. For example, disclosure of a range of 1 to 12 includes not only the range of 1 to 12, but also 1, 2, 4, 6, 10, and 12 individually, as well as any other number subsumed in the range. Furthermore, disclosure of a range of, for example, 1 to 12 includes the subsets of, for example, 1 to 6, 1 to 4, 1 to 2, 6 to 12, 6 to 10, and 10 to 12, as well as any other subset subsumed in the range. Similarly, the disclosure of Markush groups includes the entire group and also any individual members and subgroups subsumed therein. For example, disclosure of the Markush group a vinyl, allyl or hexenyl includes the member vinyl individually; the subgroup vinyl and hexenyl; and any other individual member and subgroup subsumed therein.

Abbreviations used in this application are as defined below in Table 4.

TABLE 4

| Abbreviation | Definition |
|---|---|
| ° C. | degrees Celsius |
| DP | Degree of polymerization |

TABLE 4-continued

| Abbreviation | Definition |
|---|---|
| ETCH | Ethynyl cyclohexanol |
| FT-IR | Fourier Transform Infra-Red |
| G | Grams |
| GCMS | Gas chromatography mass spectrometry |
| GPC | Gel permeation chromatography |
| Hex | hexenyl |
| Hr or hr | Hour |
| KG or kg | Kilograms |
| Ma | methacryloxypropyl |
| Me | Methyl |
| (meth)acryl | a general term including both methacryl and acryl |
| Min | Minutes |
| mm | Millimeters |
| Mn | Number average molecular weight measured by GPC |
| mPa · s | milliPascal seconds |
| Mw | Weight average molecular weight measured by GPC |
| N | normal |
| nm | Nanometers |
| NVC | Non-volatile content |
| Pa | Pascals |
| PD | Polydispersity |
| Ph | Phenyl |
| Pr | propyl |
| RPM | Revolutions per minute |
| RT | Room temperature of 25 ± 5 ° C. |
| μm or um | Micrometers |
| Vi | Vinyl |

Test Methods

Viscosity of polyorganosiloxanes described herein, such as starting materials (A) and (C), may be measured by measured at 25° C. at 0.1 to 50 RPM on a Brookfield DV-III cone & plate viscometer with #CP-52 spindle, e.g., for polyorganosiloxanes with viscosity up to 250,000 mPa·s. One skilled in the art would recognize that as viscosity increases, rotation rate decreases.

Embodiments of the Invention

In a first embodiment of the invention, a method for preparing a (meth)acrylate functional silicone comprises:

1) combining, under conditions to form a crude hydrolysis product, starting materials comprising
   A) an alkoxysilyl-functional (meth)acrylate monomer,
   B) water, and
   C) an acid catalyst;
2) removing from the crude hydrolysis product, all or a portion of a hydrolysis side-product comprising an alcohol, thereby forming a refined hydrolysis product;
3) combining, under conditions to form a condensation product, the refined hydrolysis product and starting materials comprising
   D) a polydiorganosiloxane selected from the group consisting of
      D1) an unsaturated polydiorganosiloxane having, per molecule, at least one silicon bonded aliphatically unsaturated group;
      D2) a hydroxyl-functional polydiorganosiloxane having, per molecule, at least two silicon bonded hydroxyl groups, and
      D3) a combination of D1) and D2);
   E) a condensation reaction catalyst;
   optionally F) a polydialkylsiloxane;
   optionally G) a solvent; and
   H) a free radical scavenger; thereby making a condensation reaction product comprising the (meth)acrylate functional silicone and a condensation by-product;

4) removing all or a portion of the condensation by-product during and/or after step 3);
optionally 5) neutralizing the condensation reaction product; and
optionally 6) recovering the (meth)acrylate functional silicone.

In a second embodiment, in the method of the first embodiment, starting material A) has formula $R^2R^1Si(OR^1)_2$, where each $R^1$ is an independently selected monovalent hydrocarbon group free of aliphatic unsaturation, and each $R^2$ is an independently selected (meth)acryloxyalkyl functional group.

In a third embodiment, in the method of the first or second embodiment, starting material C) comprises HCl.

In a fourth embodiment, in the method of any one of the first to third embodiments, starting material D1) comprises unit formula D1-1): $(R^6R^7_2SiO_{1/2})_b(R^7_2SiO_{2/2})_c(R^6R^7SiO_{2/2})_d(R^7_3SiO_{1/2})_e(R'OR^7_2SiO_{1/2})_f(R'OR^7SiO_{2/2})_g$, where each $R^6$ is an independently selected aliphatically unsaturated hydrocarbon group, each $R^7$ is an independently selected monovalent hydrocarbon group free of aliphatic unsaturation, each R' is independently selected from the group consisting of H and $R^7$, subscript b is 0, 1, or 2, subscript c≥1, subscript d≥0, subscript e is 0, 1, or 2, subscript f is 0, 1, or 2, and subscript g≥0, with the provisos that a quantity (b+d)≥1, a quantity (b+e+f)=2, and a quantity (b+c+d+e+f+g) is at least 3

In a fifth embodiment, in the method of the fourth embodiment, the quantity (b+c+d+e+f+g) is 3 to 250.

In a sixth embodiment, in the method of any one of the first to fifth embodiments, starting material D2) comprises unit formula D-2) comprises unit formula D-2-1): $(R^1_2SiO_{2/2})_h(R^1_3SiO_{1/2})_i(HOR^1_2SiO_{1/2})_j$, where each $R^1$ is an independently selected monovalent hydrocarbon group free of aliphatic unsaturation, subscript j is 1 or 2, subscript i is 0 or 1, a quantity (j+i)=2, subscript h≥1, and a quantity (h+i+j) is at least 3.

In a seventh embodiment, in the method of the sixth embodiment, the quantity (h+i+j) is 3 to 250.

In an eighth embodiment, in the method of any one of the first to seventh embodiments, starting material E) is a phosphonitrile halide.

In a ninth embodiment, in the method of any one of the first to eighth embodiments, step 2) comprises filtration, stripping, and/or distillation.

In a tenth embodiment, in the method of any one of the first to ninth embodiments, step 4) comprises filtration, stripping, and/or distillation.

In an eleventh embodiment, in the method of any one of the first to tenth embodiments, step 5) is present and step 5) comprises adding a neutralizing agent comprising an alkyl amine, such as trihexylamine or trioctylamine.

In a twelfth embodiment, in the method of any one of the first to eleventh embodiments, step 5) is performed before step 4).

In a thirteenth embodiment, in the method of any one of the first to twelfth embodiments, step 6) is present, and step 6) comprises filtration, stripping, and/or distillation.

In a fourteenth embodiment, in the method of any one of the first to thirteenth embodiments, each monovalent hydrocarbon group for $R^1$ is selected independently from the group consisting of alkyl groups and aryl groups.

In a fifteenth embodiment, in the method of the fourteenth embodiment, the alkyl group is methyl and the aryl group is phenyl.

In a sixteenth embodiment, in the method of the fourteenth embodiment, each $R^1$ is an alkyl group.

In a seventeenth embodiment, in the method of any one of the first to sixteenth embodiments, each (meth)acryloxyalkyl functional group for $R^2$ is independently selected from the group consisting of acryloxypropyl and methacryloxypropyl.

In an eighteenth embodiment, in the method of any one of the first to seventeenth embodiments, each aliphatically unsaturated monovalent hydrocarbon group for $R^3$ is an independently selected alkenyl group.

In a nineteenth embodiment, in the eighteenth embodiment, the alkenyl group is selected from the group consisting of vinyl and hexenyl.

In a twentieth embodiment, in the method of any one of the first to nineteenth embodiments, the (meth)acrylate functional silicone comprises unit formula:

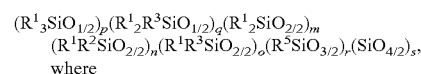
where each $R^1$ is a monovalent hydrocarbon group free of aliphatic unsaturation,
each $R^2$ is a (meth)acryloxyalkyl functional group,
each $R^3$ is an aliphatically unsaturated monovalent hydrocarbon group,
each $R^5$ is independently selected from the group consisting of $R^1$, $R^2$, and $R^3$, and
subscripts p, q, m, n, o, r, and s have values such that
a quantity (p+q)≥2,
0<m<10,000, 2<n≤10,000, a quantity (m+n+o) is 100 to 10,000, a ratio (m+o)/n is 1/1 to 500/1,
o≥0,
a quantity (q+o)>0,
0≤r≤100, and
0≤s≤100,
a ratio (m+n+o)/(r+s) is 100/1 to 10,000/1 if 0<r or if 0<s.

In a twenty-first embodiment, in the method of the twentieth embodiment, the (meth)acrylate functional silicone comprises unit formula $(R^1_2R^3SiO_{1/2})_2(R^1_2SiO_{2/2})_m(R^1R^2SiO_{2/2})_n$, a quantity (m+n) is 500 to 10,000, and a ratio m/n is 1/1 to 500/1.

In a twenty-second embodiment, the (meth)acrylate functional silicone is prepared according to the method of the twentieth or the twenty-first embodiment, and the (meth)acrylate functional silicone is used as a starting material in a pressure sensitive adhesive composition.

In a twenty-third embodiment, in the method of the twentieth embodiment, the (meth)acrylate functional silicone comprises unit formula $(R^1_3SiO_{1/2})_2(R^1_2SiO_{2/2})_m(R^1R^2SiO_{2/2})_n$, a quantity (m+n) is 500 to 10,000, and a ratio m/n is 1/1 to 500/1.

The invention claimed is:
1. A method for preparing a (meth)acrylate functional silicone, where the method comprises:
1) combining, under conditions to form a crude hydrolysis product, starting materials comprising
A) an alkoxysilyl-functional (meth)acrylate monomer,
B) water, and
C) an acid catalyst;
2) refining the crude hydrolysis, thereby forming a refined hydrolysis product;
3) combining, under conditions to form a condensation product, the refined hydrolysis product and starting materials comprising

D) a polydiorganosiloxane selected from the group consisting of
  D1) an unsaturated polydiorganosiloxane having, per molecule, at least one silicon bonded aliphatically unsaturated group;
  D2) a hydroxyl-functional polydiorganosiloxane having, per molecule, at least two silicon bonded hydroxyl groups, and
  D3) a combination of D1) and D2);
E) a condensation reaction catalyst;
optionally F) a polydialkylsiloxane;
optionally G) a solvent; and
H) a free radical scavenger; thereby making a condensation reaction product comprising the (meth)acrylate functional silicone and a condensation by-product;
4) refining the condensation reaction product during and/or after step 3);
optionally 5) neutralizing the condensation reaction product; and
optionally 6) recovering the (meth)acrylate functional silicone, where the (meth)acrylate functional silicone comprises unit formula $(R^1_2R^3SiO_{1/2})_2(R^1_2SiO_{2/2})_m(R^1R^2SiO_{2/2})_n$, where each $R^1$ is a monovalent hydrocarbon group free of aliphatic unsaturation,
each $R^2$ is a (meth)acryloxyalkyl functional group,
each $R^3$ is an aliphatically unsaturated monovalent hydrocarbon group, and
a quantity (m+n) is 500 to 10,000, and a ratio m/n is 1/1 to 500/1.

2. The method of claim 1, where starting material A) has formula $R^2R^1Si(OR^1)_2$, where each $R^1$ is an independently selected monovalent hydrocarbon group free of aliphatic unsaturation, and each $R^2$ is an independently selected (meth)acryloxyalkyl functional group.

3. The method of claim 1, where starting material C) comprises HCl.

4. The method of claim 1, where starting material D-1) comprises unit formula D1-1):
$(R^3R^1_2SiO_{1/2})_b(R^1_2SiO_{2/2})_c(R^3R^1SiO_{2/2})_d(R^1_3SiO_{1/2})_e(R'OR^1_2SiO_{1/2})_f(R'OR^1SiO_{2/2})_g$, where each $R^3$ is an independently selected aliphatically unsaturated hydrocarbon group, each $R^1$ is an independently selected monovalent hydrocarbon group free of aliphatic unsaturation, each R' is independently selected from the group consisting of H and $R^1$, subscript b is 0, 1, or 2, subscript c≥1, subscript d≥0, subscript e is 0, 1, or 2, subscript f is 0, 1, or 2, and subscript g≥0, with the provisos that a quantity (b+d)≥1, a quantity (b+e+f)=2, and a quantity (b+c+d+e+f+g) is at least 3.

5. The method of claim 1, where starting material D-2) comprises unit formula D-2) comprises unit formula D-2-1): $(R^1_2SiO_{2/2})_h(R^1_3SiO_{1/2})_i(HOR^1_2SiO_{1/2})_j$, where each $R^1$ is an independently selected monovalent hydrocarbon group free of aliphatic unsaturation, subscript j is 1 or 2, subscript i is 0 or 1, a quantity (j+i)=2, subscript h≥1, and a quantity (h+i+j) is at least 3.

6. The method of claim 1, where starting material E) is a phosphonitrile halide.

7. The method of claim 1, where step 2) comprises filtration, stripping, and/or distillation.

8. The method of claim 1, where step 4) comprises filtration, stripping, and/or distillation.

9. The method of claim 1, where step 5) is present and step 5) comprises adding a neutralizing agent comprising an alkyl amine, such as trihexylamine or trioctylamine.

10. The method of claim 1, where step 6) is present, and step 6) comprises filtration, stripping, and/or distillation.

11. The method of claim 2, where each monovalent hydrocarbon group for $R^1$ is an alkyl group.

12. The method of claim 2, where each (meth)acryloxyalkyl functional group for $R^2$ is independently selected from the group consisting of acryloxypropyl and methacryloxypropyl.

13. The method of claim 4, where each aliphatically unsaturated monovalent hydrocarbon group for $R^3$ is an independently selected alkenyl group.

14. A method for preparing a (meth)acrylate functional silicone, where the method comprises:
1) combining, under conditions to form a crude hydrolysis product, starting materials comprising
  A) an alkoxysilyl-functional (meth)acrylate monomer,
  B) water, and
  C) an acid catalyst;
2) refining the crude hydrolysis, thereby forming a refined hydrolysis product;
3) combining, under conditions to form a condensation product, the refined hydrolysis product and starting materials comprising
  D) a polydiorganosiloxane selected from the group consisting of
    D1) an unsaturated polydiorganosiloxane having, per molecule, at least one silicon bonded aliphatically unsaturated group; and
    a combination of D1) and D2), wherein
    D2) is a hydroxyl-functional polydiorganosiloxane having, per molecule, at least two silicon bonded hydroxyl groups;
    where starting material D-1) comprises unit formula D1-1): $(R^3R^1_2SiO_{1/2})_b(R^1_2SiO_{2/2})_c(R^3R^1SiO_{2/2})_d(R^1_3SiO_{1/2})_e(R'OR^1_2SiO_{1/2})_f(R'OR^1SiO_{2/2})_g$, where each $R^3$ is an independently selected aliphatically unsaturated hydrocarbon group, each $R^1$ is an independently selected monovalent hydrocarbon group free of aliphatic unsaturation, each R' is independently selected from the group consisting of H and $R^1$, subscript b is 0, 1, or 2, subscript c≥1, subscript d≥0, subscript e is 0, 1, or 2, subscript f is 0, 1, or 2, and subscript g≥0, with the provisos that a quantity (b+d)≥1, a quantity (b+e+f)=2, and a quantity (b+c+d+e+f+g) is at least 3;
  E) a condensation reaction catalyst;
  optionally F) a polydialkylsiloxane;
  optionally G) a solvent; and
  H) a free radical scavenger; thereby making a condensation reaction product comprising the (meth)acrylate functional silicone and a condensation by-product;
4) refining the condensation reaction product during and/or after step 3);
optionally 5) neutralizing the condensation reaction product; and
optionally 6) recovering the (meth)acrylate functional silicone.

15. The method of claim 14, where each aliphatically unsaturated monovalent hydrocarbon group for $R^3$ is an independently selected alkenyl group.

* * * * *